United States Patent
Yamada et al.

[19]

[11] Patent Number: 6,028,281
[45] Date of Patent: Feb. 22, 2000

[54] WIRE CUT ELECTRIC DISCHARGE METHOD AND APPARATUS

[75] Inventors: Hisanori Yamada; Tatsuo Kuroda, both of Kanagawa, Japan

[73] Assignee: Sodick Co., Ltd., Kanagawa, Japan

[21] Appl. No.: 09/068,990

[22] PCT Filed: Jun. 10, 1997

[86] PCT No.: PCT/JP97/03561

§ 371 Date: Nov. 3, 1998

§ 102(e) Date: Nov. 3, 1998

[87] PCT Pub. No.: WO98/14298

PCT Pub. Date: Apr. 9, 1998

[30] Foreign Application Priority Data

Oct. 4, 1996 [JP] Japan .................................. 8-283441

[51] Int. Cl.$^7$ ............................. B23H 1/00; B23H 7/02; B23H 7/10
[52] U.S. Cl. .................................... 219/69.12; 219/69.17
[58] Field of Search ............................. 219/69.12, 69.17; 700/162

[56] References Cited

U.S. PATENT DOCUMENTS 4,940,871  7/1990  Watanabe .............................. 219/69.12
5,113,051  5/1992  Sakaue .................................. 219/69.12

FOREIGN PATENT DOCUMENTS

1-140921  6/1989  Japan .
5-4120    1/1993  Japan .
5-301119  11/1993 Japan .
6-16970   3/1994  Japan .

Primary Examiner—Geoffrey S. Evans
Attorney, Agent, or Firm—McDermott, Will & Emery

[57] ABSTRACT

A wire electrode machining method which machines a slit (74) corresponding to a fixed path in a workpiece by electrical discharges while moving one of either a wire electrode (22) and a workpiece (W) with respect to the other based on an NC program which is a collection of program blocks, which define straight line or curved line segments of a fixed path (70), including a step of recording the position of the wire electrode which has strayed from the fixed path after machining has stopped; a step designating a segment from a collection of fixed path segments; a step determining the connection position (82) at which the wire electrode position can be connected to the designated segment (80) at the shortest distance; and a step of moving the wire electrode to a connection position in order to restore the wire electrode to a fixed path. The connection position is taken to be the intersection of a segment and a vertical line in cases in which it is possible to draw a vertical line from the wire electrode position to that designated segment, and the end of that segment which is closer to the wire electrode position when that is not the case.

5 Claims, 8 Drawing Sheets

WIRE CUT ELECTRIC DISCHARGE METHOD AND APPARATUS

TECHNICAL FIELD

The present invention relates to a wire cut electric discharge machining method and device which machines a slit corresponding to a fixed path into a workpiece, based on an NC program which is a collection of program blocks. One of either a wire electrode or the workpiece is moved with respect to the other within a plane as an electric discharge is generated between the wire electrode and the workpiece. In particular, the present invention relates to a wire cut electric discharge machining method and device which causes the wire electrode to return to its path when the wire electrode has strayed from its path after machining has been stopped in the midst of a fixed path.

BACKGROUND TECHNOLOGY

Wire cut electric discharge machining devices generally machine a thread-like slit corresponding to a fixed path in a workpiece, by means of generating an electric discharge between a wire electrode and a workpiece while causing a traveling wire electrode to move relative to a workpiece along a fixed path. Wire electrodes having a diameter of 0.3 to 0.01 mm are normally conveyed to a wire pulling device from a wire bobbin via multiple pulleys and a pair of wire guides which impart tension to the wire. During machining, the wire electrode travels between the pair of wire guides in a vertically stretched state. The path of movement of the wire electrode relative to the workpiece is described within a vertical plane (X-Y plane) in the direction traveled by the wire electrode. The operator normally creates the NC program which determines this path—a collection of program blocks—prior to machining. Such wire cut electric discharge devices have an extremely high machining accuracy and are suited to precision machining. The wire electrode may break in the midst of the movement path and machining due to the condition of small pieces of the workpiece produced by machining. Such undesirable wire breakage is detected, for example, by a sudden drop in the tension applied to the wire.

In general, when such a wire electrode wire break is discovered, the pair of wire guides is caused to move within the X-Y plane from the position where the machining stop to the start hole in the workpiece which is the starting point of the wire movement path. This movement is automatically executed based on an NC program. The wire electrode is then pressed through the start hole and connected to a device which pulls the wire. The diameter of the start hole is greater than the width of the machining slit, so the wire electrode can be easily pushed through the start hole. After this action to restore the continuity of the wire electrode from the wire bobbin to the wire tensioning device—the so-called "wire connection"—the wire, again tensioned between the pair of wire guides, is returned to the position where the machining stop.

However, when the machining stop position is separated from the start hole, time is required to restore the wire electrode. The operator may move the pair of wire guides by eye from the machining stop position to a position at which he judges it will be easy to manually perform a "wire connection" using, for example, a remote control device. In most cases, a location in the machining slit having a simple shape is selected for this purpose. The operator manually pushes the wire electrode through the machining slit, connecting the wire to a tensioning device.

Figure 5A:
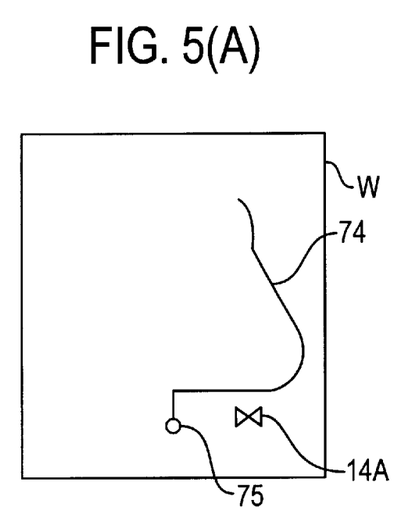
FIG. 5(A) is a plan view of a wire guide and workpiece during wire connection.
Figure 5B:
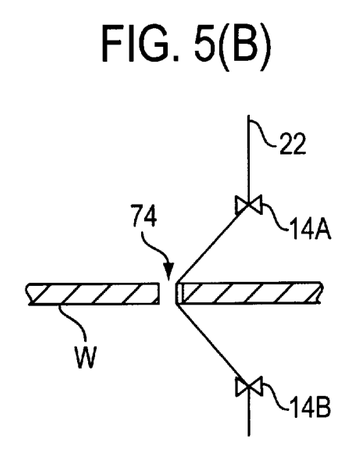
FIG. 5(B) is a sectional view of a wire guide and workpiece during wire connection.

As the operator has moved the wire guides along the machining slit by eye, as illustrated in FIG. 5(B), its position may not precisely match that of the wire movement path. In such cases, a bend occurs in the wire between the pair of wire guides 14A and 14B. In FIG. 5(B), the positional offset between wire electrode 22 and slit 74 is exaggerated, but in order to remove this undesirable bend it is necessary to restore wire electrode 22 to the wire movement path. It may be difficult for the operator to restore wire electrode 22 to the wire movement path by eye through manipulation of a remote control device.

SUMMARY OF THE INVENTION

An object of the present invention is to provide a wire cut electric discharge device and method by means of which a wire electrode can be easily restored to the wire movement path when machining has stopped in the midst of the wire movement path, and the wire electrode has subsequently strayed from that path.

Another object of the present invention is to provide a wire cut electric discharge machining method and device in which, when a wire electrode breakage occurs, the wire electrode is quickly and reliably restored.

Other objects of the present invention are partially noted in the description which follows below, and will be partially apparent to practitioners in the field through implementation of the invention.

In order to achieve the aforementioned and other objects, a wire cut electric discharge machining method and device are provided for machining a slit corresponding to a fixed path based on an NC program into a workpiece, the fixed path being a collection of program blocks, each defining a segment of the fixed path, each of which is either a straight or a curved line, along which either a wire electrode or a workpiece is moved with respect to the other within a plane as an electric discharge is generated between the wire electrode and the workpiece. The wire electric discharge machining method includes:

a step of recording the position of the wire electrode which has strayed from a fixed path;

a step of designating one segment from the segment collection of the fixed path;

a step of determining the shortest distance to a connection position along the designated segment at which the wire electrode position can be connected;

a step of moving the wire electrode to the connection position in order to restore the wire electrode to a fixed path.

Preferably, the connection position is at the intersection of a segment and a line perpendicular thereto, when a perpendicular line can be drawn to the designated segment from the wire electrode position. When that is not the case, the connection position is at that end of the segment's two ends which is closer to the wire electrode position.

Furthermore, the wire electric discharge machining device according to the present invention includes a motion device which causes one of either the wire electrode or workpiece to move relative to the other, and a control unit which reads an NC program which is a collection of program blocks, each defining one segment of the fixed path, each segment being either a straight line or a curve, thus instructing the aforementioned motion device to move along the aforementioned fixed path, machining a slit corresponding to the aforementioned fixed path in the workpiece by means of electrical discharge. The device further includes a memory which records the multiple program blocks, the position at which machining stop in the midst of the fixed path, and the position of the wire electrode which has strayed from the fixed path;

an input device to input a segment from the fixed path segment collection;

a device for determining the shortest distance to a connection position at which the wire electrode position can be connected to the input segment; and a device, connected to the memory and connection position determining devices, for determining a path for restoring the wire electrode to the machining stop position and, based on the machining stop position, the wire electrode position, the connection position, and the program block which defines the portion of the fixed path between the connection position and the machining stop position.

PRESENTLY PREFERRED EMBODIMENT

Figure 1:
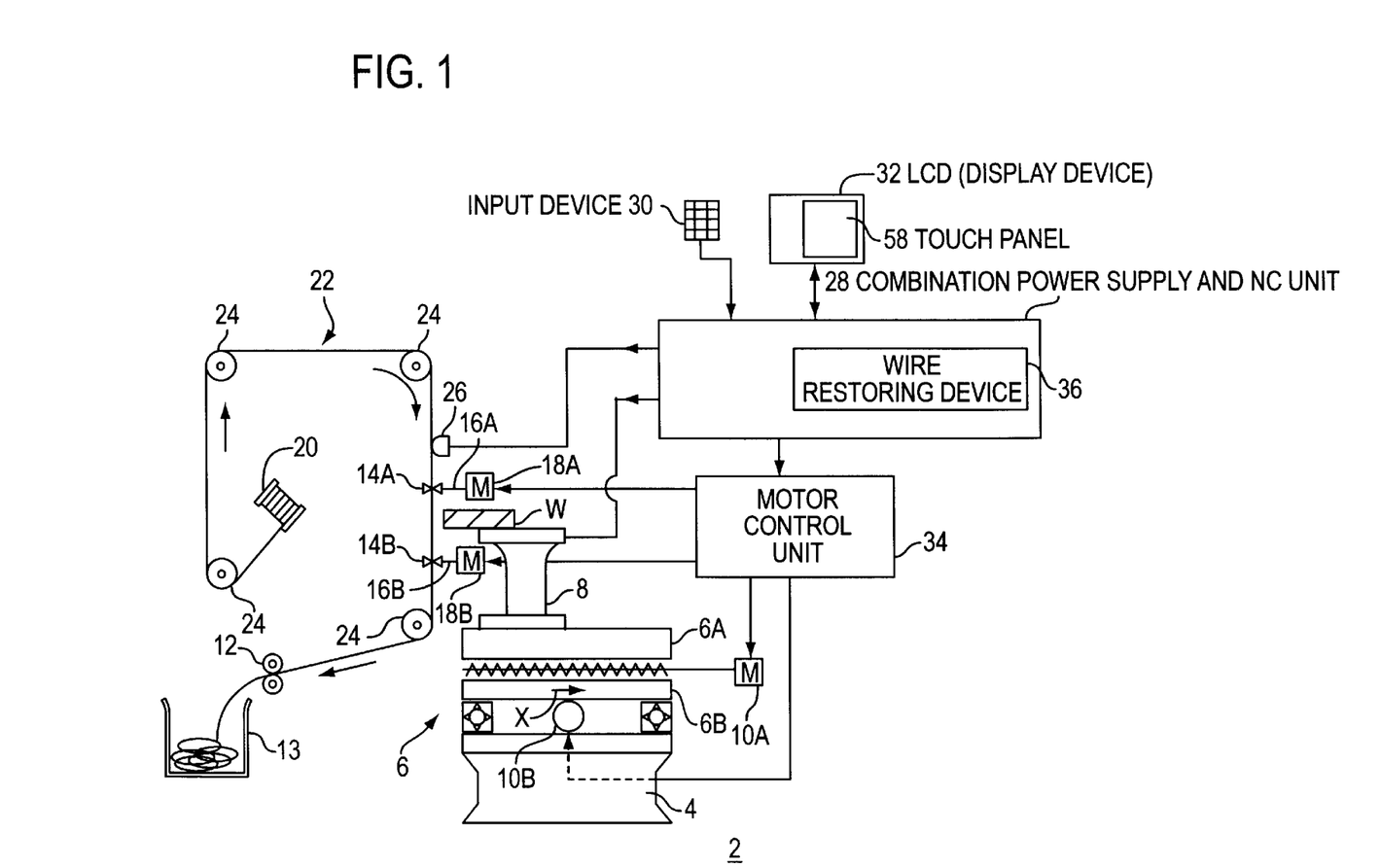
FIG. 1 illustrates a wire cut electric discharge device including a device for restoring a wire electrode with a broken wire.

A wire cut electric discharge device having the wire restoring device of the present invention is explained below with reference to the figures. As illustrated in FIG. 1, the wire cut electrical discharge machining device 2 includes an X-Y table installed on a bed 4. This X-Y table 6 comprises an X table 6A, which moves in the X direction shown by the arrow in FIG. 1, and a Y table 6B, which moves in the Y direction perpendicular to the X direction. The X table 6A and the Y table 6B are moved by ball screws connected respectively to servo motors 10A and 10B. A work stand 9, which affixes a workpiece W, is provided on the X-Y table 6.

The wire electrode 22, unwound from the wire bobbin 20, is conveyed to a pair of wire guides 14A and 14B along a fixed conveyance path via multiple pulleys 24. An upper wire guide 14A and a lower wire guide 14B are arrayed vertically so as to face the workpiece W, and are respectively linked to motors 18A and 18B through arms 16A and 16B. The pair of wire guides 14A and 14B are, as with the X-Y table 6, movable through the operation of a remote control device (not shown). Furthermore, the wire electrode 22 is conveyed to an appropriate wire-recovery bucket 13 via a pulley 24 and a wire tensioning device 12. During machining, the wire electrode 22 travels toward a bucket 13 under application of a fixed tension.

A wire cut electrical discharge machining device 2 includes a combination power supply, which applies a voltage between the wire electrode and the workpiece W and an NC unit 28. The combination power supply and NC unit 28 is connected to a contact element 26 provided on the wire conveyance path which contacts the wire electrode 22, and to the workstand 8. A display device 32, such as an LCD, which displays the wire movement path and is provided, for example, with an input device 30 or a touch panel 58 with which an operator inputs NC programs and various parameters, is connected to the NC unit 28. The touch panel 58 is a device through which positional information is input by touching its surface using, for example, a finger. The NC unit 28 reads the input NC program and supplies pulse signals which correspond in number to the amount of movement of the motor control unit 34. The motor control unit 34 supplies drive signals to motors 10A, 10B, 18A, and 18B respectively in accordance with those pulse signals. The combination power supply and NC unit 28 includes an NC unit 38 comprising, for example, a microprocessor, video processing unit 46, and a portion of a wire restoring unit 36, which restores the wire electrode 22 to the wire movement path, and further to the position at which machining stop.

Figure 2:
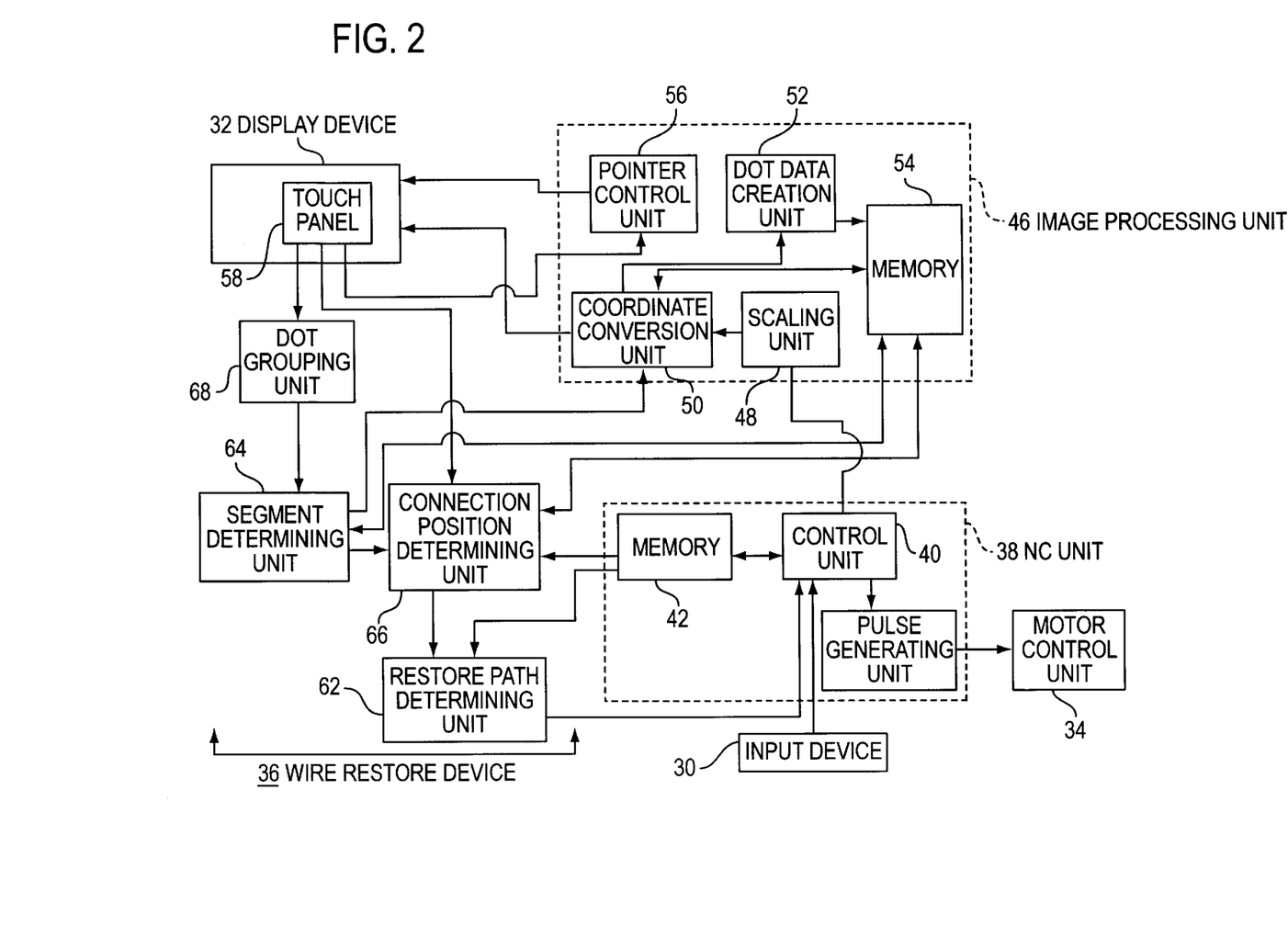
FIG. 2 is a block diagram illustrating an embodiment of the wire restoring device of FIG. 1.

As illustrated in FIG. 2, the NC unit 38 includes a control unit 40 which reads an NC program from the input device 30 and controls the entire wire cut electrical discharge machining motion, a memory 42 comprising, for example, ROM, which records the information required to restore the wire electrode 22 to the position at which machining stop, and a pulse generating unit 33 which generates pulse signals to drive the motor.

Figure 3:
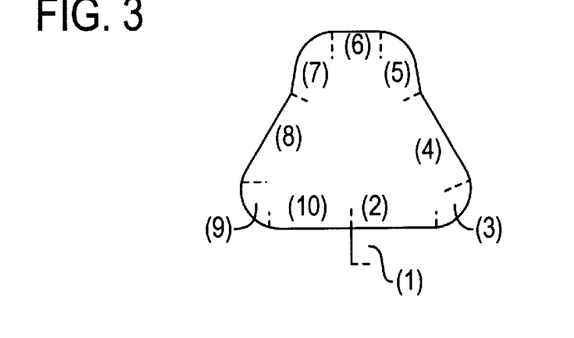
FIG. 3 is a diagram depicting an example of a wire movement path comprising multiple segments.

The control unit 40 reads the NC programs, which are collections of program blocks, prepared prior to machining, and assigns block numbers to each program block. Each of the program blocks is defined as a single segment of the either straight or curved line wire movement path. FIG. 3 illustrates an example of a wire movement path comprising 10 segments. For example, one program block includes information that the segment is a straight line and the length of the segment. Or, a program block includes information that the segment is a curve, and information relating to its curvature and direction traveled (clockwise or counter-clockwise). The control unit 40 supplies multiple program blocks and block numbers to the memory 42, and the memory 42 records that information in a table form whereby each program block is related to a block number. The control unit 40 provides to a pulse generating unit 44 a movement instruction signal indicating a movement amount obtained by reading the NC program. The pulse generating unit 44 provides pulse signals to the motor control unit 34 which correspond in number to the amount of movement.

The control unit 40 includes multiple program blocks and block numbers to the video processing unit 46. The video processing unit 46 includes a scaling unit 48, a coordinate conversion unit 50, a dot data creation unit 52, a memory 54 comprising, for example, RAM, and a pointer control unit 56. The scaling unit 48 scales the wire movement path determined by the program block to the display device 32 screen size. The coordinate conversion unit 50 assigns the coordinates in the screen coordinate system to a number of points in the scaled wire movement path. The dot data creation unit 52 creates the dots which form the scaled wire movement path. The memory 54 records the coordinate data from the coordinate conversion unit 50 and the dot data from the dot data creation unit. The pointer control unit 56 controls the pointer displayed on the screen of display device 32.

Figure 6:
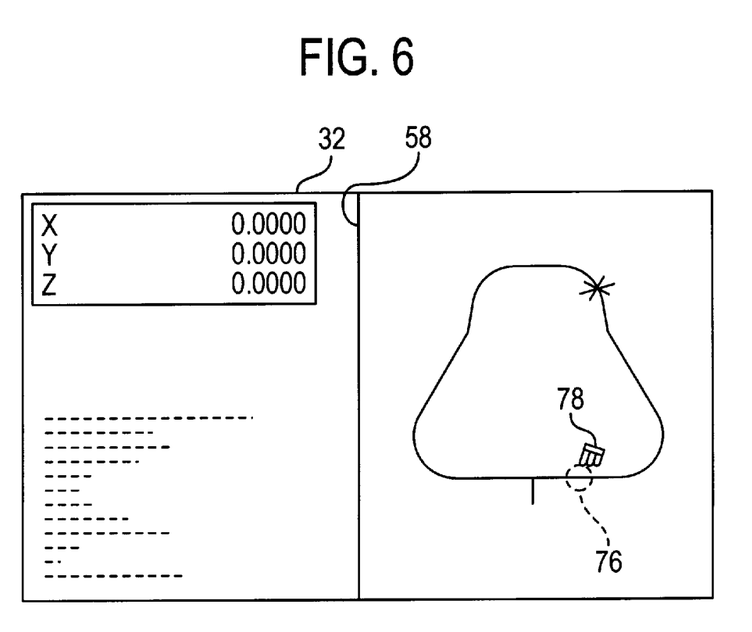
FIG. 6 shows the display on a display device after wire connection.
Figure 7:
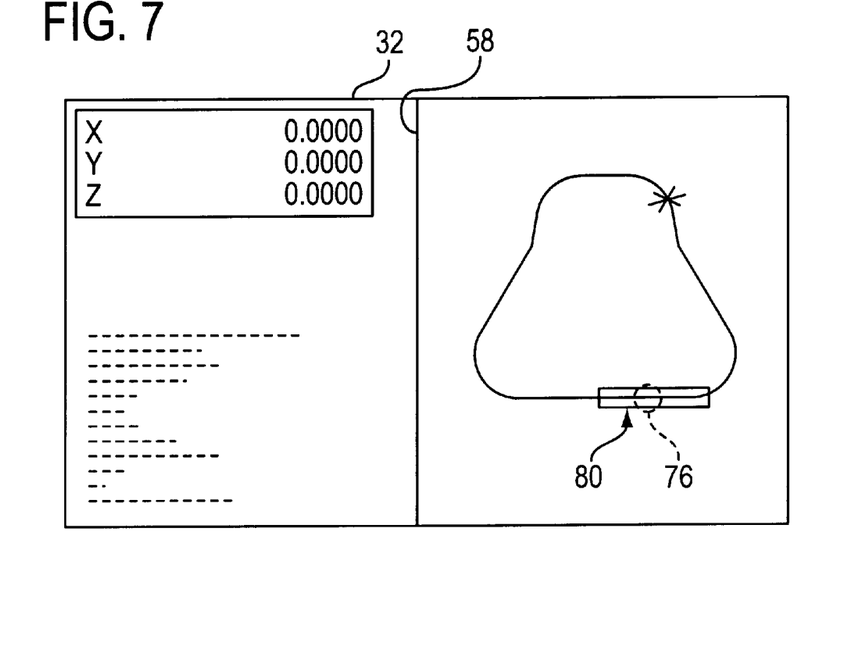
FIG. 7 shows the display on a display device after wire connection.

The wire restoring device 36 includes the display device 32, the touch panel 58, a dot grouping unit 68, a segment determining unit 64, a connection position determining unit 66, and a restore path determining unit 62. The touch panel 58 provides the position information for the dots touched by the operator's finger. The touch panel 56 displays a pointer on the screen which points to the dot position in response to that position information. The dot grouping unit 68 creates a group of dots by adding dots around the dot touched by the operator's finger in accordance with specified rules. In other words, the dot grouping unit 68 converts the points touched by the operator's finger to a region such as that shown by reference numeral 76 in FIG. 6. Upon receiving data showing a group of dots from the dot grouping unit 68, the segment determining unit 64 compares that group of dots with the group of dots in the wire movement path stored in the memory 54. The segment determining unit 64 further determines a segment which includes matching dots between the two groups. In this manner, the touch panel 58, the dot grouping unit 68, and the segment determining unit 64 make it possible for the operator to designate a segment along the wire movement path segment. The designated segment is fixed by the program block number which identifies that segment, and the block number is stored in the memory 54. The designated segment is further sent to display the device 32 via the coordinate conversion unit 50. The display device 32, as illustrated in FIG. 7, emphasizes the designated segment 80. The connection position determining unit 66 responds to an operational instruction from the touch panel 58, and determines the position at which the wire electrode position can be connected to the segment over a minimum distance—the "connection position." This "connection position" information is provided to the restore path determining unit 62. The restore path determining unit 62 reads the program blocks relating to the "connection position" segment on the wire movement path to the position at which machining was stopped from memory, and determines a path to cause the wire electrode 22 to return to the position at which machining stop via the "connection position." This information relating to the restore path is provided to the control unit 40.

Figure 10:
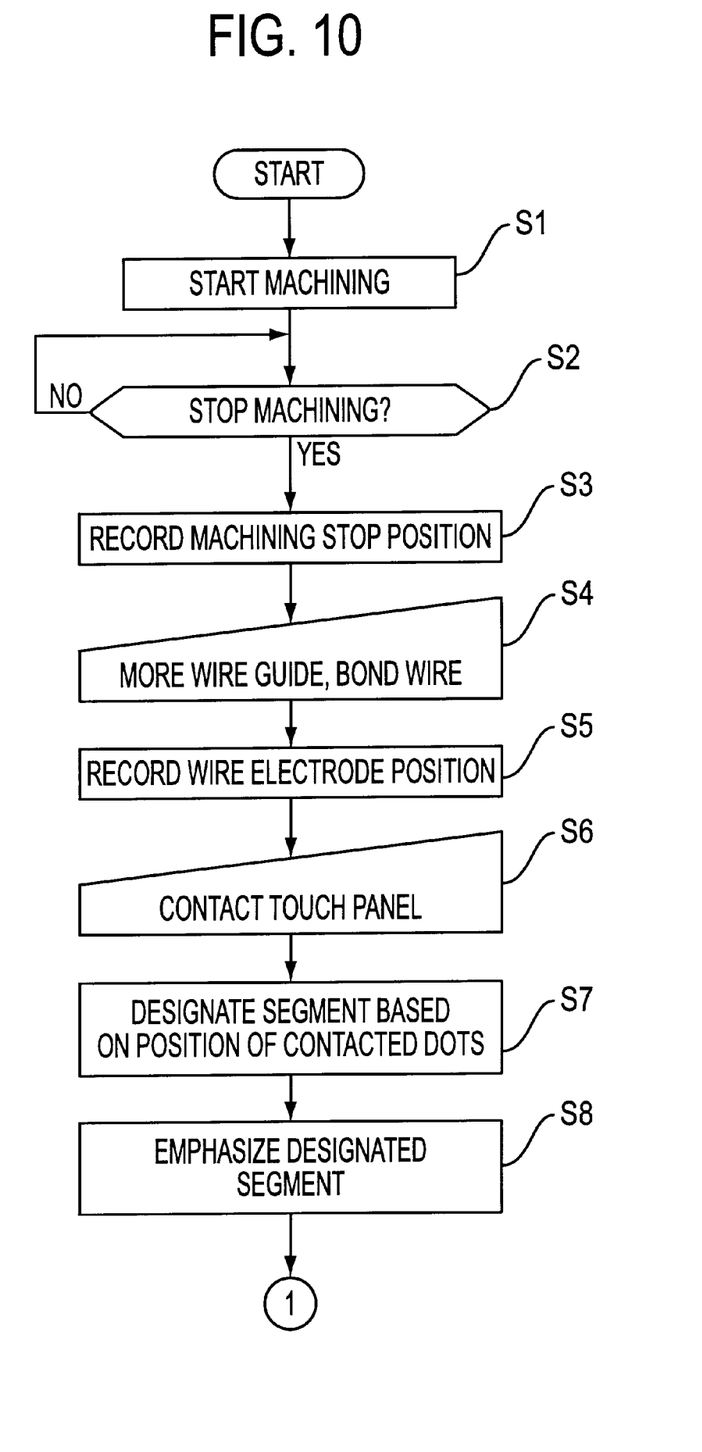
FIGS. 10 and 11 are timing charts illustrating the operation of the wire restoring device.
Figure 11:
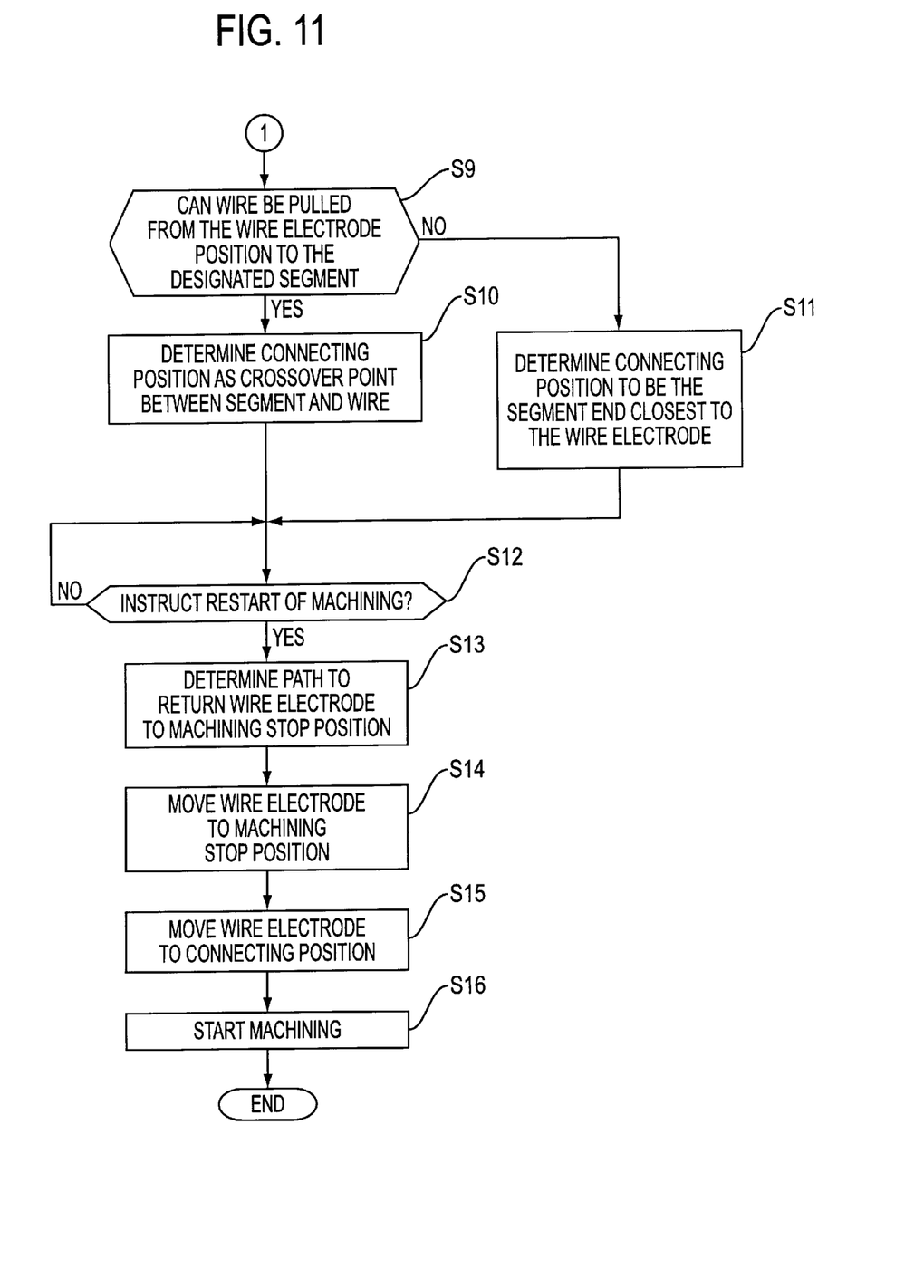

Next, referring to FIG. 10 and 11, a method is described for restoring a wire electrode to a path when the wire electrode has strayed from its path after machining stops due to a wire electrode wire breakage. It must be borne in mind, however, that the causes for machining stoppages are not limited to wire electrode wire breakage. Similarly, the causes for a deflection of the wire electrode from the path set by the operator are not limited to those indicated in the present embodiment.

As illustrated in FIG. 3, in the illustrated embodiment of the present invention, the wire movement path is formed of 10 segments. Block numbers from 1 to 10 are assigned to each segment of the wire movement path, which is to say to each program block, in accordance with the machining order.

In step S1, wire cut electric discharge machining commences. During machining, the wire electrode 22, which is to say the pair of wire guides 14A and 14B, moves within the X-Y plane relative to the workpiece W along the wire movement path. At this time, the wire electrode 22 travels along the wire conveyance path under a fixed tension, and an electric discharge is generated between the wire electrode 22 and the workpiece W.

Figure 4A:
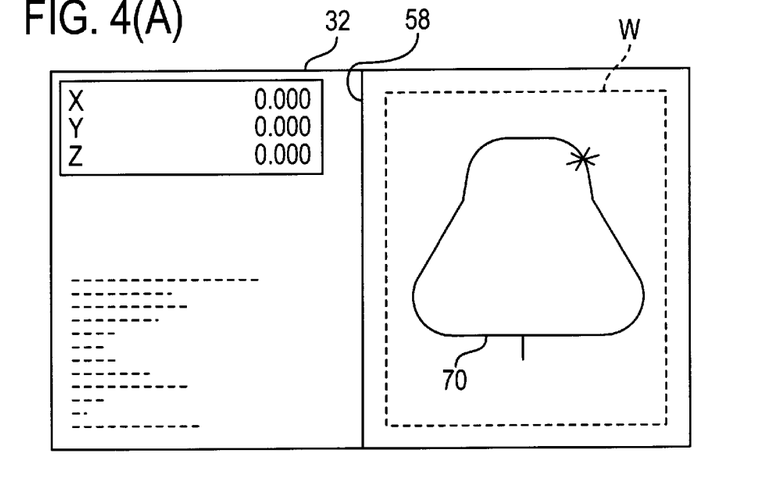
FIG. 4(A) shows the display on a display device during machining.
Figure 4B:
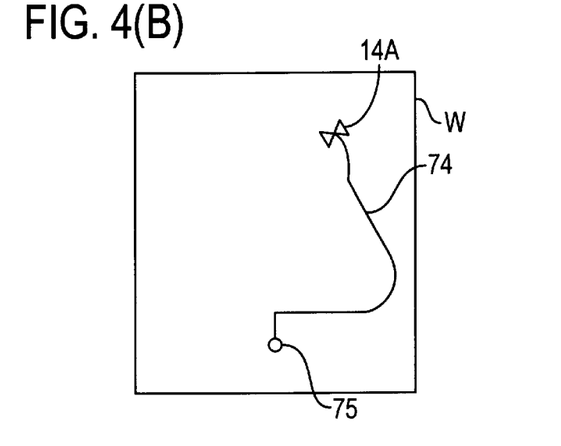
FIG. 4(B) is a plan view of a wire guide and a workpiece being machined.

FIG. 4(A) illustrates the wire movement path displayed on the display device 32 screen during machining. The wire movement path is shown by the solid line 70, and the position of the wire electrode 22 machining workpiece W, which is to say the pair of wire guides 14A and 14B, is shown by the * mark. The coordinates of the position of the wire electrode 22 and the NC program are displayed on the screen at the left side of the display device 32. FIG. 4(B) illustrates workpiece W when the wire electrode 22 is positioned at the * mark during machining. A start hole 75, which is the starting point of the wire movement path, is formed in the workpiece W. The position of the wire electrode 22 during machining is constantly detected by the NC control unit 38 and recorded in the memory 42.

The occurrence of a machining stoppage is constantly being judged in step S2. When the wire electrode 22 breaks at the * mark position on the screen in FIG. 4(A) and machining stops, the wire electrode 22 position at the point when the breakage occurred, which is to say the coordinate of the position at which machining stop, is recorded during step S3 in the memory 42. As is well depicted in FIG. 3, the machining stoppage position is contained in the segment which determines the block number (5) program block.

In step S4 the operator operates a remote control device to move the pair of wire guides 14A and 14B relative to the workpiece W, and places those in a position at which he determines that a manual "wire connection" can be easily performed. In the embodiment, the movement of wire guides 14A and 14B by means of a remote control device is not reflected on the * mark in the display device 32 screen. The position used for "wire connection" depends on factors such as the position in which the operator will stand to perform the wire connection and the simplicity of the shape of the machining slit 74. The operator may try to place the pair of wire guides 14A and 14B in a position which matches the machining slit 74, but it is extremely difficult for an operator to do so by eye. After moving the wire guides 14A and 14B, the operator pushes the wire electrode 22 through the machining slit 74 in a manual operation, and then connects that to the wire tensioning device 12.

FIG. 5(A) illustrates workpiece W when wire connection is completed. The position of the wire electrode 22, slightly offset from the machining slit 74 in the X-Y plane, is recorded during step S5 in the memory 42. Therefore, as illustrated in FIG. 5(B), the wire electrode 22 is bent between the wire guides 14A and 14B. The positional offset in FIG. 5(A) and 5(B) between the wire electrode 22 and the machining slit 74 is exaggerated to more easily understand the invention.

Figure 8A:
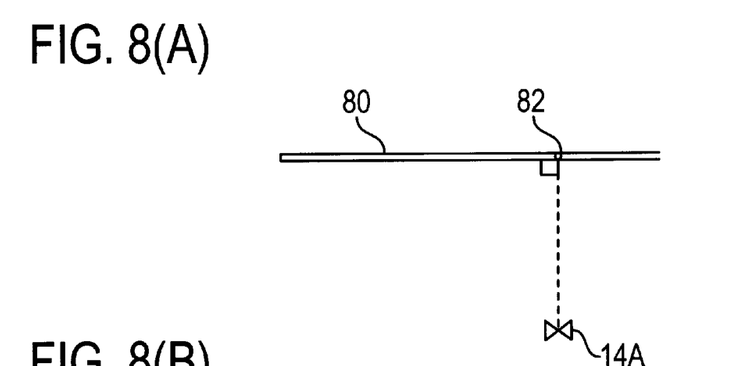
FIG. 8(A) is a diagram showing the position in which the wire guides contacts the wire movement path in the X-Y plane.
Figure 8B:
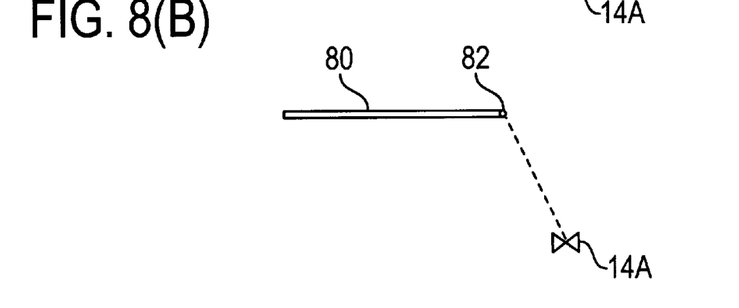
FIG. 8(B) is another diagram showing the position in which the wire guide contact the wire movement path in the X-Y plane.

The position of the wire electrode 22 may have to be corrected toward the machining slit 74 side in order to remove the bend in the wire electrode 22. In step S6, the operator designates the position of the wire electrode 22 from the 10 wire movement path segments by touching the surface of the touch panel 58 with his finger. In step S7, the segment determining unit 64 determines the segment designated by the operator, based on the position of the dot[s] touched by the operator on the screen. In step S8, as illustrated in FIG. 7, this segment 80 is emphasized by a thick line, or it may also be emphasized by a color different from the other portions of the wire movement path, or the like. This segment 80 corresponds to the block number (2) program block in FIG. 3. The segment determining unit 64 sends a block number to the connection position determining unit 66. In step S9, the connection position determining unit 66 determines whether or not a vertical line can be drawn from the wire electrode 22 position to the designated segment 80. As is illustrated in FIG. 8(A), if a vertical line to segment 80 is possible, the method advances to step S10, and the intersection 82 of segment 80 with that vertical line is determined to be the connection position. When that is not the case, the method advances to step S11 and, as illustrated in FIG. 8(B), the 82 of the two segment 80 ends closer to the wire electrode is determined to be the connection position.

Figure 9A:
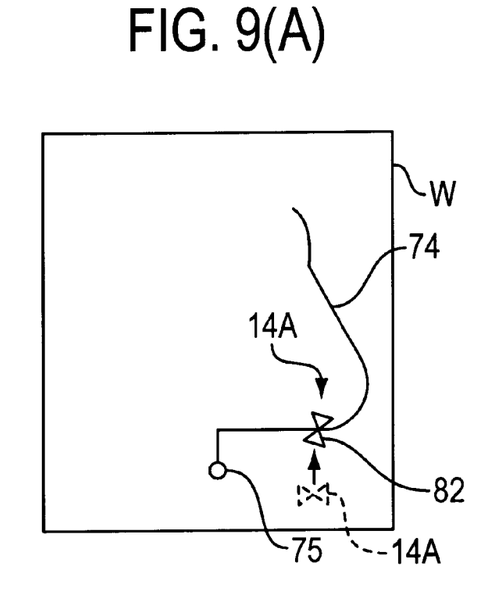
FIG. 9(A) is a plan view of the wire guide and the workpiece when the wire guide contacts the wire movement path in the X-Y plane.
Figure 9B:
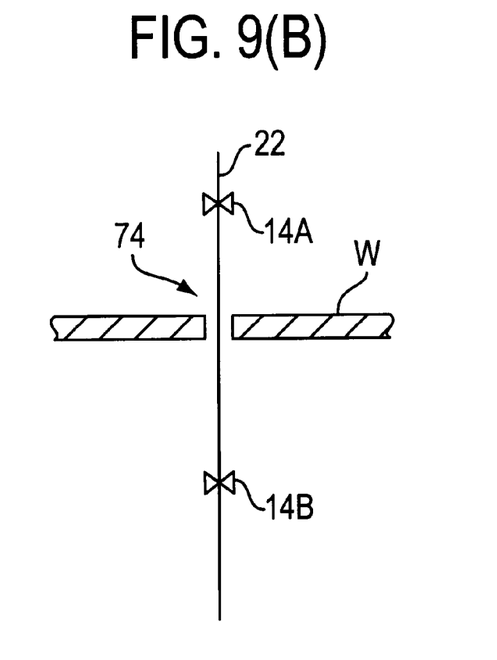
FIG. 9(B) is a section view of the wire guide and the workpiece when the wire guide contacts the wire movement path in the X-Y plane.

Next, in step S12, when an operator signal, instructing machining to resume, is input from the input device 30, the restore path determining unit 62 reads the program block relating to the portion of the wire movement path from the "connection position" to the position of machining stoppage from the memory 42. In the embodiment illustrated in FIG. 3, program blocks are read for block numbers (2), (3), (4), and (5). Then, in step S13, the restore path determining unit 62 determines the path by which the wire electrode 22 will be restored to the machining stoppage position via the "connection position." Based on this information about the restoration path, the control unit 40 returns the wire electrode 22 to "connection position" 82, as illustrated in FIG. 9(A) (S14) FIG. 9(B) illustrates the wire electrode 22 arrayed vertically in the machining slit 74 at this time. Furthermore, in step S15 the wire electrode 22 is returned to the machining stoppage position over the wire movement path. A voltage is applied and machining is resumed between the wire electrode 22 and the workpiece W at this machining stoppage position. (S16).

The present invention is not limited to exactly the forms disclosed. In light of the above explanation, it is clear that many improvements and variations are possible. For example, in the illustrated embodiment the touch panel 58, the dot grouping unit 68, and the segment determining unit 64 were provided for the purpose of operator designation of a wire movement path segment. However, it would alternatively be possible for a wire movement path with a block number attached to be displayed on the display device 32, as shown in FIG. 3, and for the operator to input block numbers to the input device 30 while viewing such a display. The illustrated example was selected in order to explain the essence and practical application of the invention. The scope of the invention is defined in the attached Claims.

It is claimed:

1. A wire cut electrical discharge machining method for machining a slit in a workpiece by means of an electrical discharge while moving a wire electrode relative to a workpiece along a programmed path based on an NC program, the NC program comprising a collection of program blocks each of which defines a straight line or curved line segment of the programmed path, the method comprising the steps of:

recording the position of a wire electrode which has strayed from the programmed path;

designating a segment from the collection of program blocks;

determining a connection position for connecting the wire electrode position to the designated segment over the shortest distance; and moving the wire electrode to the connection position to restore the wire electrode to the programmed path.

2. The method according to claim 1, wherein the step of determining the connection position comprises determining an intersection between the designated segment and an orthogonal line to the designated segment as the connection position, where an orthogonal line can be drawn from the wire electrode position to the designated segment.

3. The method according to claim 1 wherein the step of determining the connection position comprises determining the end point of the designated segment when an orthogonal line cannot be drawn from the wire electrode position to the slit machined in the designated segment.

4. A wire cut electrical discharge machining device for machining a slit in a workpiece by means of electrical discharges between a wire electrode and the workpiece, and including a movement device for moving the wire electrode relative to the workpiece along a programmed path and a control means for reading an NC program which comprises a collection of program blocks, each of said blocks defining either a straight line or curved line segment of said programmed path, and for instructing the movement device to effect relative movement along the programmed path, the wire cut electrical discharge machining device further comprising:

a memory which records a stop position at which machining stops in the middle of the programmed path, and the position of a wire electrode which has become offset from the programmed path;

means for designating the segment corresponding to a program block at which said machining stoppage occurred;

a connection position determining means to determine a connection position for connecting the wire electrode position to the designated segment over the shortest distance; and means for determining a path to restore the wire electrode to the machining stop position, based on the program block which includes the stop position, the wire electrode position, and the connection position, said means for determining a path being connected to the memory and the connection position determining means.

5. The apparatus according to claim 4 wherein the path determined by the means for determining a path comprises a line orthogonal to the designated segment where an orthogonal line can be projected between the wire electrode position and the slit machined in the designated segment, or a line defined by the end of the end of the slit formed in the designated segment and the wire electrode position when an orthogonal line cannot be projected between the slit formed in the designated segement and the wire electrode position.

* * * * *